(12) United States Patent
Maehara et al.

(10) Patent No.: US 9,731,439 B2
(45) Date of Patent: Aug. 15, 2017

(54) VEHICLE INTERIOR BOARD AND METHOD FOR MANUFACTURING THE SAME

(71) Applicant: MORIDEN Co., Ltd., Tokyo (JP)

(72) Inventors: Yoshitaka Maehara, Ota (JP); Yousuke Shigeno, Ota (JP)

(73) Assignee: MORIDEN CO., LTD, Tokyo (JP)

( * ) Notice: Subject to any disclaimer, the term of this patent is extended or adjusted under 35 U.S.C. 154(b) by 387 days.

(21) Appl. No.: 14/237,186

(22) PCT Filed: Dec. 27, 2012

(86) PCT No.: PCT/JP2012/008364
§ 371 (c)(1),
(2) Date: Feb. 5, 2014

(87) PCT Pub. No.: WO2014/102866
PCT Pub. Date: Jul. 3, 2014

(65) Prior Publication Data
US 2016/0016521 A1    Jan. 21, 2016

(51) Int. Cl.
*B29C 44/12* (2006.01)
*B60R 13/02* (2006.01)
*B60R 13/01* (2006.01)
*B32B 5/02* (2006.01)
*B32B 5/18* (2006.01)
(Continued)

(52) U.S. Cl.
CPC ...... *B29C 44/1233* (2013.01); *B29C 44/1214* (2013.01); *B29C 44/1242* (2013.01); *B32B 3/12* (2013.01); *B32B 5/022* (2013.01); *B32B 5/18* (2013.01); *B32B 27/36* (2013.01); *B60R 13/011* (2013.01); *B60R 13/013* (2013.01);
(Continued)

(58) Field of Classification Search
CPC ............ B29C 44/1214; B29C 44/1233; B29C 44/1242
USPC .... 264/46.4, 46.5, 273, 261, 46.6, 262, 267, 264/274, 275
See application file for complete search history.

(56) References Cited

U.S. PATENT DOCUMENTS 5,401,449 A * 3/1995 Hill ........................ B29C 44/569
156/245
5,783,133 A * 7/1998 Hara ...................... B29C 43/146
264/261
(Continued)

FOREIGN PATENT DOCUMENTS

EP            2520410 A1    7/2012
JP       2001-354069 A    12/2001
(Continued)

*Primary Examiner* — Atul P. Khare
(74) *Attorney, Agent, or Firm* — Banner & Witcoff, Ltd.

(57) ABSTRACT

Included are a first board having a hard polyurethane foam layer formed in a space sandwiched between a pair of thin plates, and a second board having a porous structure where a recessed groove is formed in one main surface, a part of the second board being arranged in the space and joined to the first board. The hard polyurethane foam layer is also formed in gaps between the thin plates and the second board to join the boards. Thus, the step of molding the first board can join and integrate the boards, and mold a bendable, lightweight, and very strong vehicle interior board. Therefore, the vehicle interior board can be reduced in number of parts, simplified in manufacturing process, and improved in productivity.

3 Claims, 8 Drawing Sheets

(51) Int. Cl.
 B32B 27/36 (2006.01)
 B32B 3/12 (2006.01)
(52) U.S. Cl.
 CPC ...... B60R 13/02 (2013.01); *B32B 2266/0278* (2013.01); *B32B 2605/003* (2013.01)

(56) References Cited

U.S. PATENT DOCUMENTS

| | | | | |
|---|---|---|---|---|
| 6,287,080 | B1* | 9/2001 | Evans | B29C 39/10 |
| | | | | 415/200 |
| 6,403,195 | B1* | 6/2002 | Montagna | B32B 5/26 |
| | | | | 156/242 |
| 6,620,365 | B1* | 9/2003 | Odoi | B29C 45/14377 |
| | | | | 264/261 |
| 8,182,233 | B2* | 5/2012 | Goldfinch | B21D 53/78 |
| | | | | 416/229 R |
| 2009/0016894 | A1* | 1/2009 | Strother | B21D 26/055 |
| | | | | 416/241 R |

FOREIGN PATENT DOCUMENTS

| | | |
|---|---|---|
| JP | 2006-182208 A | 7/2006 |
| JP | 2009-018513 A | 1/2009 |
| JP | 2011-136664 A | 7/2011 |

* cited by examiner

FIG. 4
(A)
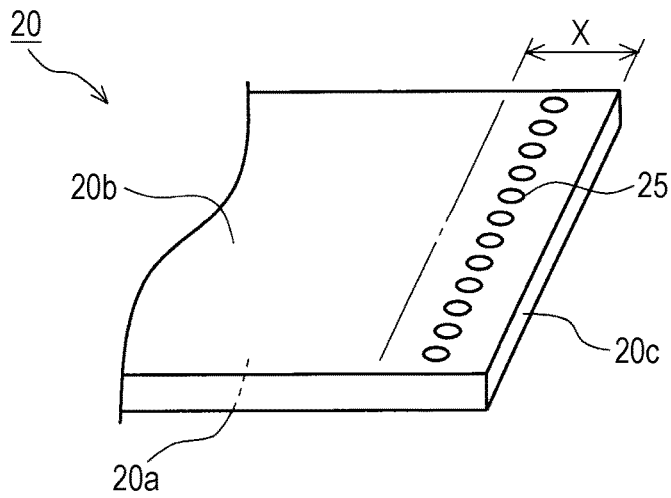
(B)
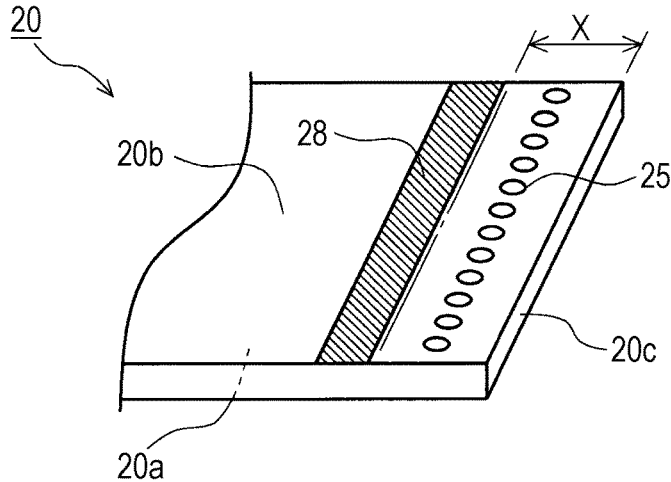
(C)
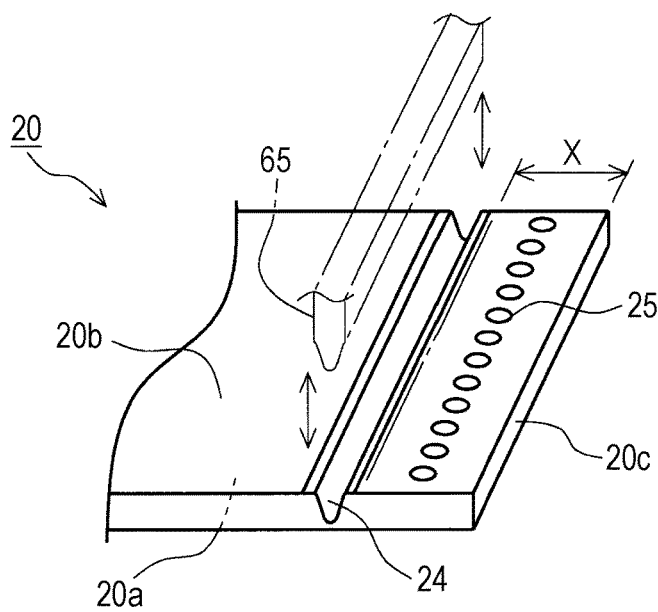

FIG. 5
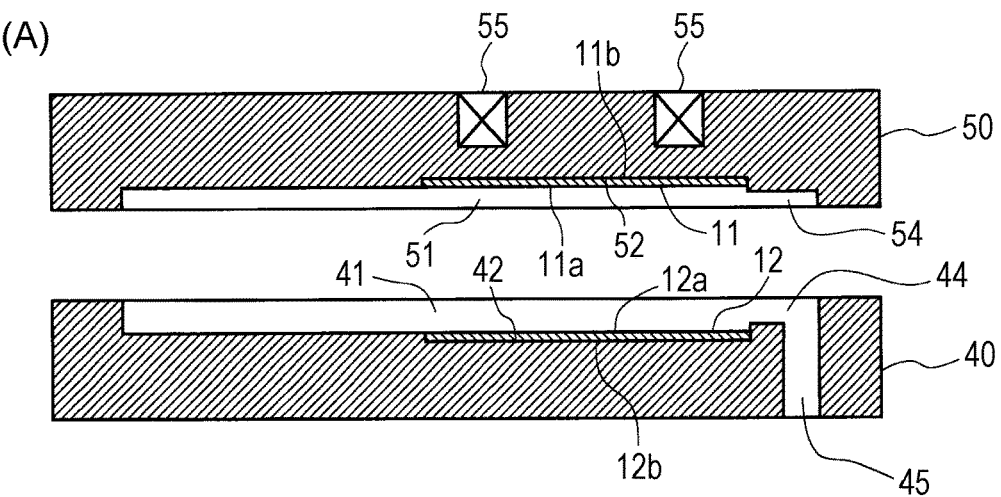
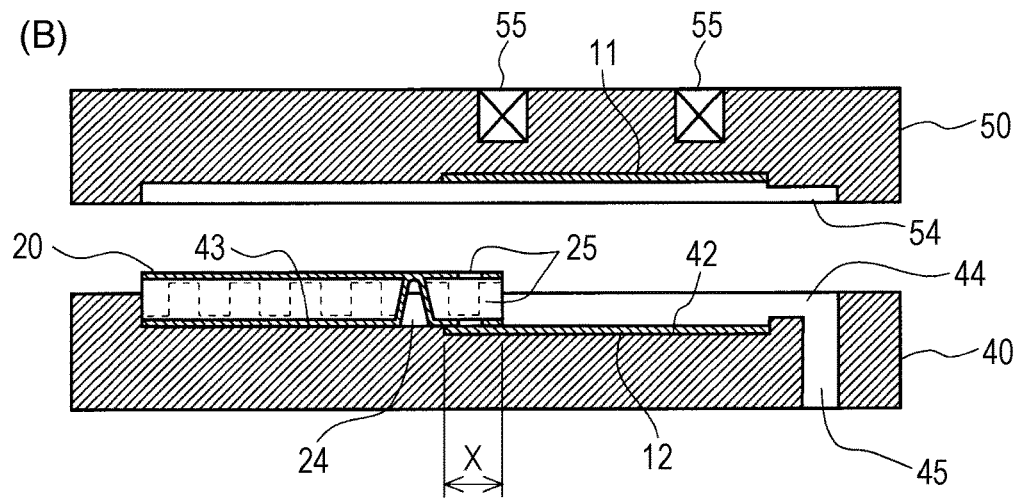
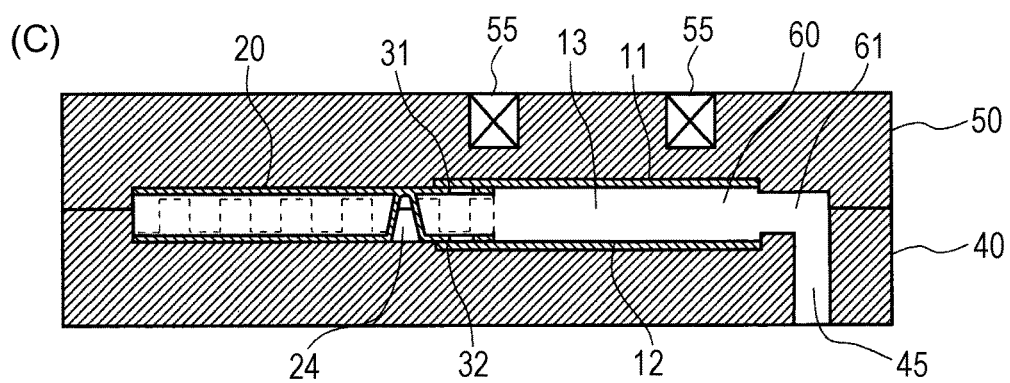

FIG. 7
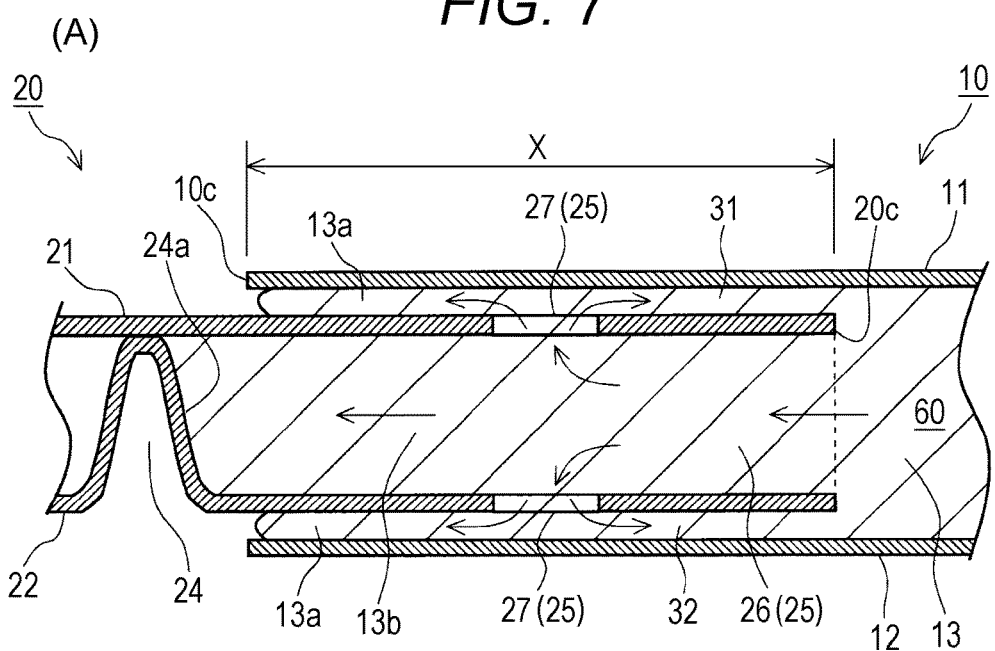
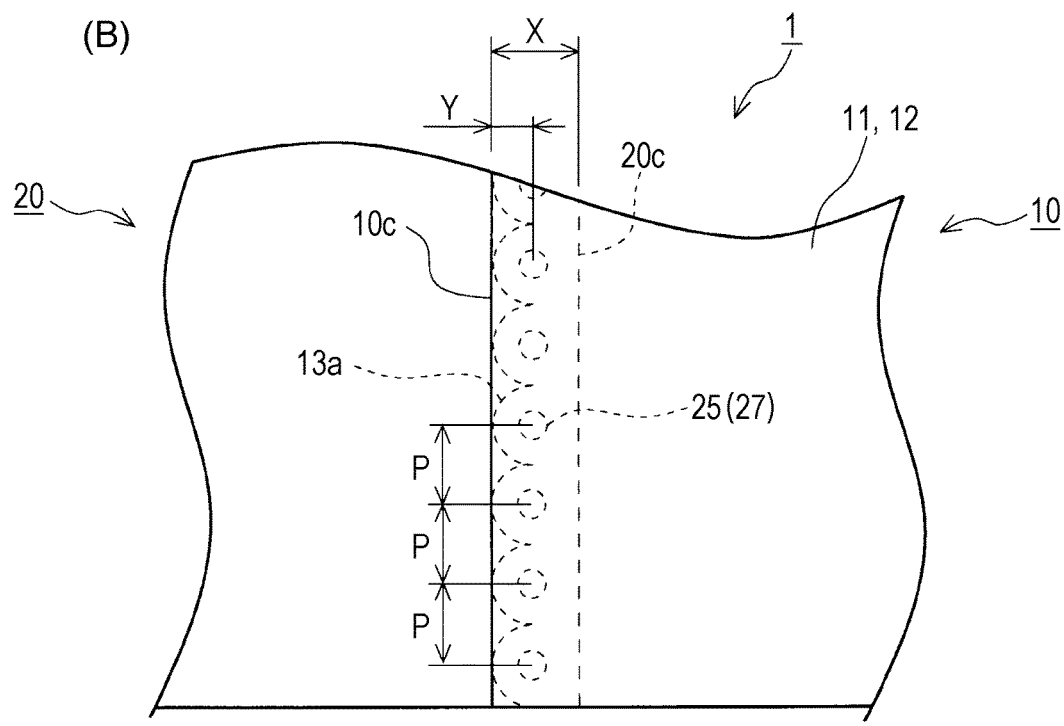

VEHICLE INTERIOR BOARD AND METHOD FOR MANUFACTURING THE SAME

CROSS-REFERENCE TO RELATED APPLICATION

The present application is a U.S. National Phase filing of International Application No. PCT/JP2012/008364 filed on Dec. 27, 2012, designating the United States of America, and this application claims the benefit of the above-identified application, which is incorporated by reference herein in its entirety.

TECHNICAL FIELD

The present invention relates to a vehicle interior board used for a floorboard and the like of the luggage compartment of a vehicle, and a method for manufacturing the vehicle interior board. In particular, the present invention relates to a vehicle interior board including a bendable hinge portion, and a method for manufacturing the vehicle interior board.

BACKGROUND ART

Conventionally, a deck board 200 illustrated in FIG. 9 is known as this kind of vehicle interior board (for example, JP-A-2001-354069).

A floor portion of a rear luggage compartment of a van type vehicle is provided with a recess where a spare tire and the like are stored. The deck board 200 covers the recess and serves as a floor surface of the luggage compartment. The deck board 200 is divided into a front board 220 and a rear board 230. A plurality of middle hinges 260 rotatably couples a rear end of the front board 220 to a front end of the rear board 230.

Such a configuration permits only a part of the divided board (the rear board 230) to be opened and closed. Thus, luggage and the like that are stored below the deck board 200 can be easily taken out.

Moreover, a reinforcing pipe 213, a reinforcing rib 214, and outer peripheral flanges 221 and 231 are disposed on a back surface of the deck board 200. Consequently, the stiffness of the deck board 200 is secured.

SUMMARY OF INVENTION

Problems to be Solved by the Invention

A known technique illustrated in FIG. 9 is a method for coupling the divided boards (the front board 220 and the rear board 230) with a plurality of hinge parts (the middle hinges 260) being separate parts. However, the method requires the step of assembling the entire board other than the step of molding each part. The step of coupling the boards with the hinge parts has a problem that work of positioning parts, fixing the parts, and the like is very complicated. In this manner, the necessity of the step of coupling and assembling the boards reduces the production efficiency of the vehicle interior board. Furthermore, such necessity is a factor to increase the rate of occurrence of assembly failure and the cost of production.

Furthermore, the conventional vehicle interior board requires divided boards, hinge parts, fastening parts, and the like. In other words, there is a problem in that the number of parts is large. Thus, the parts should be individually processed and managed, and such requirements also become factors of increasing production costs.

Moreover, the boards are formed by dividing. Hence, there is a problem of decreases in strength of the opposite ends and surrounding portions thereof (hereinafter, referred to as "edges") of the adjacent boards, which are not fixed to the hinge part. A reinforcing member (for example, the reinforcing pipe 213 illustrated in FIG. 9) can also be provided to secure strength around the coupling portion. In this case, however, the number of parts is further increased and the weight of the product is increased.

In addition, the above-mentioned edges between the boards, which are not fixed to the hinge part, may deform. Thus, unevenness may be caused on the surface of the board around the coupling portion of the board, causing a problem in that the flatness of the surface of the board reduces, and the product is defiled.

The present invention has been made in consideration of the above circumstances. An object of the present invention is to provide a vehicle interior board including a bendable hinge portion and having a small number of parts and excellent productivity as well as being lightweight and very strong.

Solutions to the Problems

A vehicle interior board includes: a first board including a pair of thin plates and a hard polyurethane foam layer formed in a space between the thin plates; and a second board including a plate-shaped porous structure where a recessed groove is formed in at least one main surface, a part of the second board being arranged in the space and joined to the first board. The hard polyurethane foam layer is also formed in gaps between the thin plates and the second board to join the first board and the second board.

A method for manufacturing a vehicle interior board constructed by arranging at least a first board and a second board in plane, and coupling parts of the first and second boards. The method includes the steps of: preparing a plate-shaped porous structure to be the second board, and forming, in a part thereof, an injection hole penetrating from one main surface through to the other main surface; preparing a pair of thin plates, arranging one main surfaces of the thin plates opposed to each other with a predetermined distance away while sandwiching an area of the second board, where the injection hole is formed, between parts of the thin plates; and injecting liquid raw material of hard polyurethane foam into a space sandwiched between the thin plates to cause a reaction, and forming a hard polyurethane foam layer. The step of forming the hard polyurethane foam layer includes supplying the liquid raw material also to gaps between the thin plates and the second board through the injection hole to mold the first board while joining and integrating the first and second boards.

Effects of the Invention

According to a vehicle interior board and a method for manufacturing the same of the present invention, an edge of a second board is inserted between thin plates of a first board. A hard polyurethane foam layer included in the first board joins the first and second boards. Hence, the step of molding the first board enables the first and second boards to be joined and integrated. Thus, the vehicle interior board can be simplified in manufacturing process, suppressed in occurrence of assembly failure, and improved in productivity.

Furthermore, a recessed groove is formed in the second board and used as a hinge portion to make the vehicle interior board bendable. Thus, there is no need to separately prepare hinge parts, fastening parts for fixing the hinge parts, and the like. The number of parts of the vehicle interior board can be therefore reduced.

Moreover, the first board having a very strong lightweight multilayer structure and the second board having a porous structure that is lighter than the first board are adopted. Hence, the weight reduction of the entire board can be promoted while the strength thereof required for each use location can be secured.

In addition, the whole opposite ends of the first and second boards are integrated into one piece. Thus, a sufficient strength can be secured around the coupling portion of the boards. Hence, a reinforcing part and the like are not required separately in the vicinity of the coupling portion of the boards. An increase in the number of parts can be therefore suppressed, allowing the board to be lightweight.

Furthermore, an injection hole is formed in the portion of the second board sandwiched between the thin plates. Thus, the hard polyurethane foam layer is also formed in the joint portion of the second board and the thin plate, and the injection hole to firmly joint the first and second boards can be therefore firmly joined.

Moreover, a honeycomb structure is adopted as the porous structure. The injection hole includes a cavity portion of the honeycomb structure, and openings that are formed in face plates and communicate with the cavity portion. Thus, the parts can be easily processed, and exert sufficient joint strength.

BRIEF DESCRIPTION OF THE DRAWINGS

FIG. 4A is a perspective diagram illustrating the processing of an injection hole of the second board according to the embodiment of the present invention; FIG. 4B is a perspective diagram illustrating the attachment of a skin material; and FIG. 4C is a perspective diagram illustrating the processing of a recessed groove.

FIG. 5A is a cross-sectional view of a molding apparatus of the vehicle interior board according to the embodiment of the present invention in a state where thin plates are set; FIG. 5B is a cross-sectional view of a state where the second board is set; and FIG. 5C is a cross-sectional view of a state where a hard polyurethane foam layer is molded.

FIG. 7A is an enlarged cross-sectional view of the vicinity of the coupling portion, illustrating the formation of the hard polyurethane foam layer of the vehicle interior board according to the embodiment of the present invention; and FIG. 7B is a top view thereof.

DESCRIPTION OF EMBODIMENTS

Hereinafter, a vehicle interior board according to an embodiment of the present invention will be described in detail with reference to the drawings.

Figure 1:
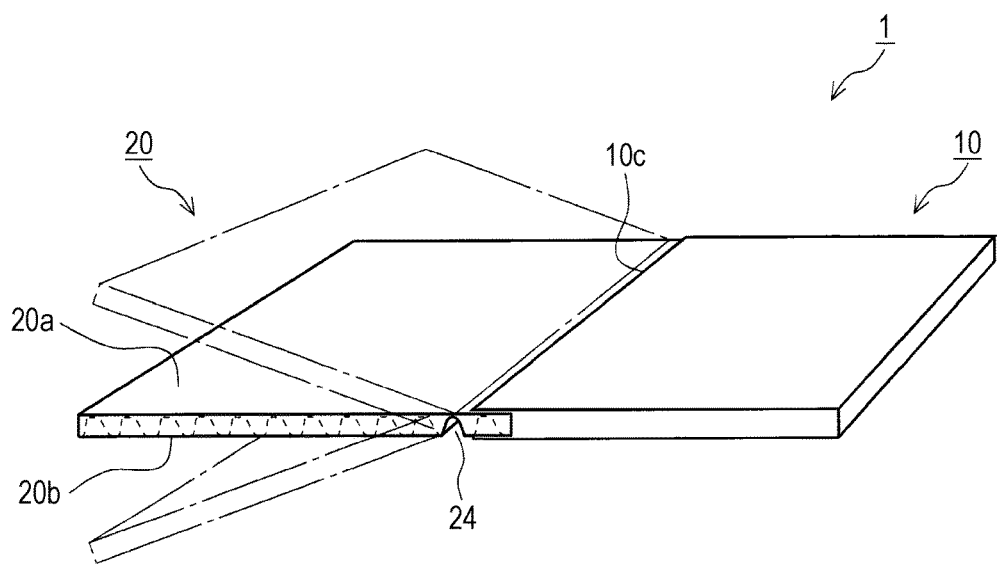
FIG. 1 is a perspective diagram illustrating a general structure of a vehicle interior board according to an embodiment of the present invention.
Figure 2:
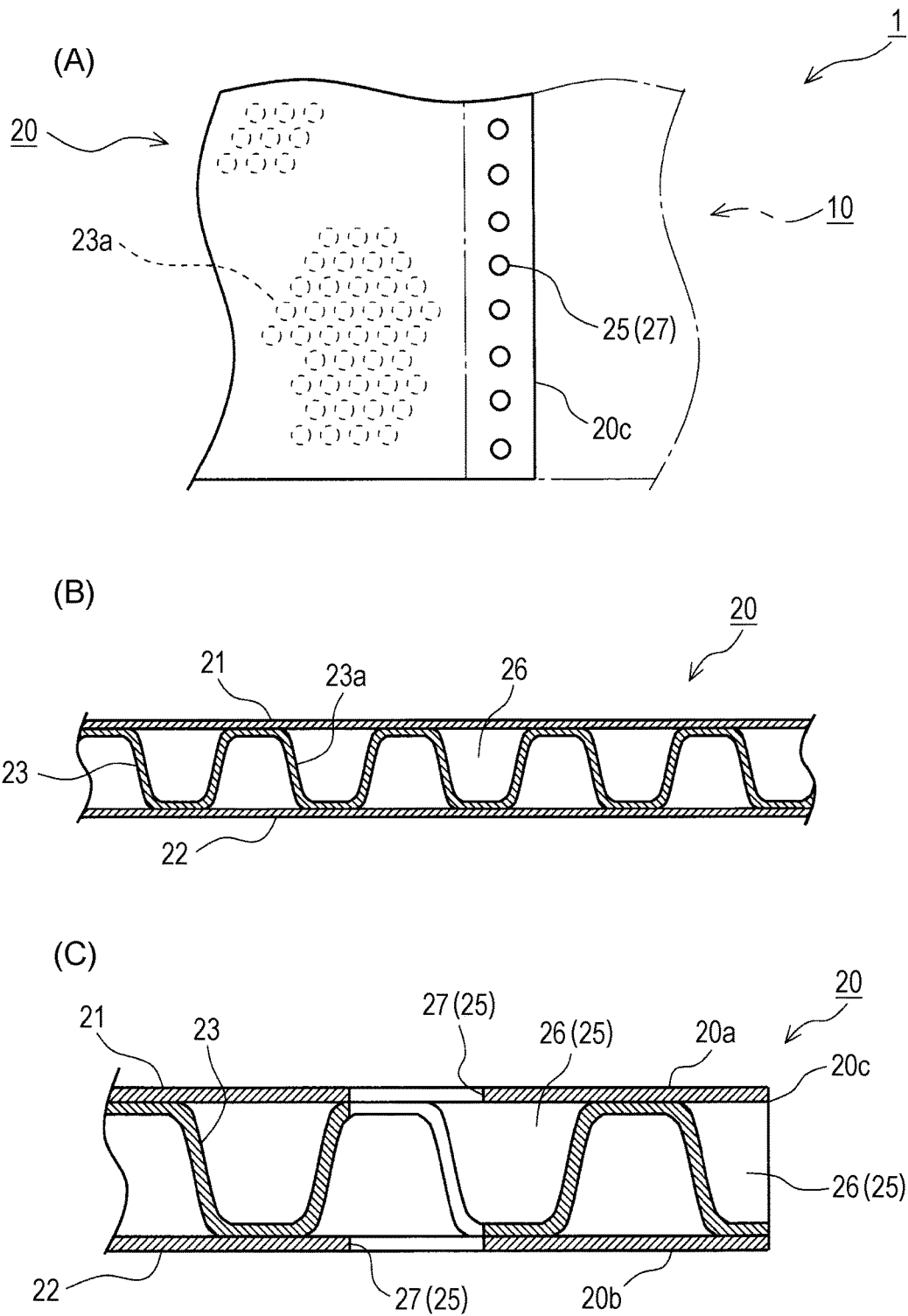
FIG. 2A is a top view of a general structure of a second board according to the embodiment of the present invention.
FIG. 2B is a cross-sectional view thereof.
FIG. 2C is an enlarged cross-sectional view of an injection hole portion.

First, a configuration of a vehicle interior board 1 will be described in detail with reference to FIGS. 1 to 3. FIG. 1 is a perspective diagram schematically illustrating a general structure of the vehicle interior board 1. The vehicle interior board 1 is used, for example, as a floorboard of a luggage compartment of an automobile. The vehicle interior board 1 is molded in a predetermined outline shape depending on the use.

As illustrated in FIG. 1, the vehicle interior board 1 is configured by coupling a first board 10 and a second board 20. A recessed groove 24 is formed in one main surface 20b of the second board 20. The recessed groove 24 extends linearly along an end 10c of the first board 10. Thus, the vehicle interior board 1 can be bent using the recessed groove 24 as a hinge portion.

The direction in which the vehicle interior board 1 is bent may be any of a direction of the main surface 20b with the recessed groove 24 formed therein, and a direction of a main surface 20a opposite to the recessed groove 24. If the vehicle interior board 1 is bent in the direction in which the recessed groove 24 is formed, a bending angle can be regulated within a predetermined range. On the other hand, if the vehicle interior board 1 is bent toward the opposite side of the recessed groove 24, a large bending angle can be secured. A main surface where the recessed groove 24 is formed and a bending direction are appropriately selected depending on the use.

A carpet or the like is attached to the main surface of the vehicle interior board 1 as a finish skin material (not shown). The finish skin material may be any of nonwoven fabrics or the like made of polyethylene terephthalate (PET), nonwoven fabrics made of other materials, fiber fabrics, and various kinds of other sheet materials.

FIG. 2A is a top view of a general structure of the second board 20 according to the embodiment of the present invention. FIG. 2B is a partial cross-sectional view thereof. FIG. 2C is an enlarged cross-sectional view of the vicinity of an injection hole 25.

As illustrated in FIG. 2B, the second board 20 includes a pair of face plates 21 and 22, and a core material 23 sandwiched between the face plates 21 and 22. The second board 20 is a flat plate-shaped honeycomb structure (porous structure) with a thickness of approximately 3 to 30 mm. A cavity portion 26 is formed in a surrounding space of the core material 23 sandwiched between the face plates 21 and 22. Thus, the vehicle interior board 1 can exert predetermined strength while reducing its weight.

The core material 23 is a thin structure. A plurality of substantially cylindrical support walls 23a is formed in the core material 23 and arranged substantially vertical to the face plates 21 and 22. As illustrated in FIG. 2A, the substantially cylindrical support walls 23a are arranged at predetermined intervals and formed over the entire second board 20. The cavity portions 26 around the outsides of the support walls 23a having substantially cylindrical shapes communicate with each other.

In the embodiment, polypropylene resin (PP) is adopted as material of the face plates 21 and 22 and the core material 23. The resin material has advantages of easy availability and excellent processability. In addition, the resin material can also be used for the use that requires water resistance. The material of the face plates 21 and 22 and the core material 23 is not limited to this, but other resin materials, paper, and the like can also be used.

Furthermore, the core material 23 of the honeycomb structure in the second board 20 may have another support wall arrangement structure such as one having a hexagonal shape or square shape. Moreover, the second board 20 is not limited to the honeycomb structure. The second board 20 may be provided with a cavity between the face plates 21 and 22. For example, the core material 23 may be another filler such as a wave-shaped plate or a fiber filler. Additionally, the second board 20 may be a flat plate-shaped porous structure made of foamed resin material or the like.

As illustrated in FIG. 2A, the injection hole 25 is formed at an edge of the second board 20, the edge being joined to the first board 10. As illustrated in FIG. 2C, openings 27 that communicate with the cavity portion 26 are formed in the face plates 21 and 22. Thus, the injection hole 25 is formed. The injection hole 25 penetrates from the one main surface 20a to the other main surface 20b of the second board 20 through the openings 27 and the cavity portion 26. Moreover, the cavity portions 26 of the injection holes 25 open toward an end surface 20c of the second board 20, the end surface 20c being a side to be joined to the first board 10. In other words, the injection hole 25 is formed such that space outside the main surfaces 20a and 20b of the second board 20 communicate with space outside the end surface 20c.

Figure 3:
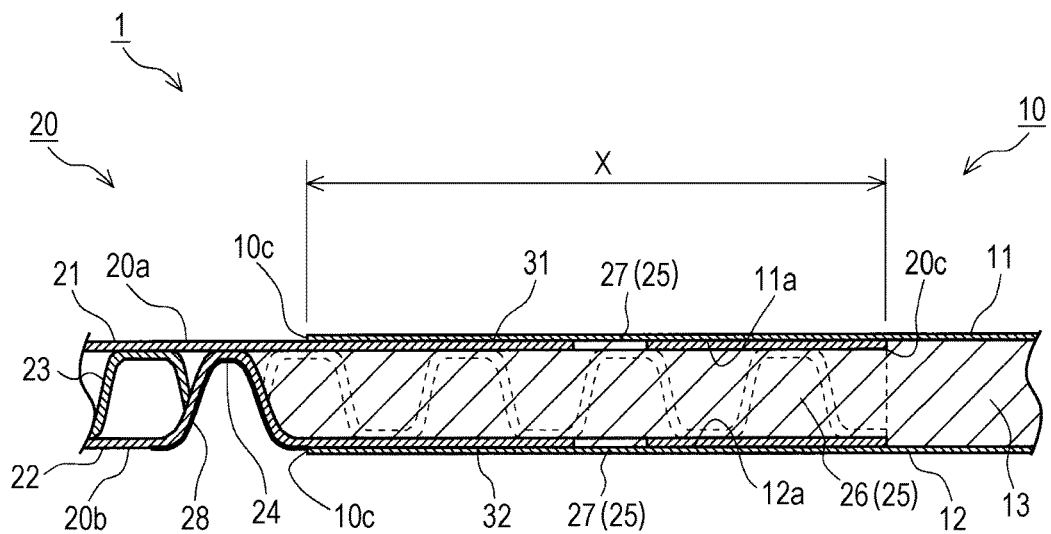
FIG. 3 is an enlarged cross-sectional view of a general structure of the vicinity of a coupling portion of the vehicle interior board according to the embodiment of the present invention.

FIG. 3 is an enlarged cross-sectional view schematically illustrating a general structure of the vicinity of the coupling portion of the vehicle interior board 1. As illustrated in FIG. 3, the first board 10 is a plate-shaped body having a multilayer structure, including a pair of thin plates 11 and 12, and a hard polyurethane foam layer 13 sandwiched between the thin plates 11 and 12. The adoption of such a structure can make the first board 10 very strong and lightweight.

Various sheet materials including metal thin plates such as steel plates or aluminum plates, glass cloth, carbon, resin and other fiber materials, a composite material, and the like can be used for the thin plates 11 and 12. In the embodiment, flat zinc plating steel plates with a thickness of approximately 0.08 to 0.18 mm are used as the thin plates 11 and 12. In the drawings, for the purpose of description, the thicknesses of the thin plates 11 and 12 are illustrated large. In this manner, the thin plates 11 and 12 are very thin. Hence, the level differences at the ends 10c of the thin plates 11 and 12 does not matter in terms of the quality of the product. In other words, the surface in the vicinity of the coupling portion of the vehicle interior board 1 is substantially flat.

A part of the second board 20 is arranged in a space formed between the thin plates 11 and 12. The part is the above-mentioned edge joined to the first board 10, where the injection holes 25 are formed. In other words, the edge of the second board 20 is sandwiched between the thin plates 11 and 12 (see FIG. 6). The second board 20 includes a portion overlapping with the thin plates 11 and 12. The overlapping portion is represented by an "overlap allowance X". The size of the "overlap allowance X" is, for example, approximately 20 to 100 mm.

The hard polyurethane foam layer 13 is also formed in the cavity portions 26 and the openings 27 that serve as the injection holes 25 of the second board 20. Furthermore, the hard polyurethane foam layer 13 is also formed in contact areas of the thin plates 11 and 12 with the second board 20, the contact areas being represented by the "overlap allowance X." In other words, the hard polyurethane foam layer 13 is also formed in gaps 31 and 32 formed in a manner where a surface 11a of the thin plate 11 and a surface 12a of the thin plate 12 are opposed to the main surfaces 20a and 20b of the second board 20. Thus, the first board 10 and the second board 20 are joined firmly.

As described above, the recessed groove 24 having a substantially V-shaped cross section or substantially U-shaped cross section is formed in the one main surface 20b of the second board 20. The recessed groove 24 serves as a bendable hinge portion. The recessed groove 24 is formed to extend linearly along the ends 10c of the first board 10. The cross-sectional shape of the recessed groove 24 is not limited to this. The recessed groove 24 is formed in the vicinity of the ends 10c of the first board 10 (the ends of the thin plates 11 and 12). The recessed groove 24 is formed on an outer side of the first board 10, in other words, on an inner side of the edge indicated by the overlap allowance X of the second board 20.

Furthermore, a skin material 28 is attached to at least the groove inner surface of the recessed groove 24. The details are described below. Moreover, a finish skin material (not illustrated) with a predetermined thickness is attached to the main surface of the vehicle interior board 1 depending on the use.

In this manner, in the vehicle interior board 1 of the present invention, the first board 10 and second board 20 are directly joined using the hard polyurethane foam layers 13 as joint materials. The second board 20 is provided with the recessed groove 24 as a hinge. Thus, there is no need to separately prepare hinge parts, fastening parts for fixing the hinge parts, and the like. The number of parts of the vehicle interior board 1 can be therefore reduced.

Moreover, the very strong first board 10 is arranged for a portion to which a large load is applied, and the lighter second board 20 having a porous structure is adopted for a portion having a small load. Thus, the weight reduction of the entire board can be promoted while the strength thereof required for each use location can be secured.

Moreover, the whole opposing edges of the first board 10 and the second board 20 are joined in a substantially band form, and integrated into one piece. Thus, the edges of the boards 10 and 20 can be prevented from deforming. Furthermore, the surface of the vehicle interior board 1 can be prevented from becoming uneven. Moreover, a sufficient strength in the vicinity of the coupling portion of the boards can be secured without providing a reinforcing part and the like separately in the vicinity of the coupling portion of the boards. Therefore, an increase in the number of parts can be suppressed, and the vehicle interior board 1 can be made lightweight.

Next, a method for manufacturing the vehicle interior board 1 will be described in detail with reference to FIGS. 4A to 7B. FIG. 4A is a perspective diagram illustrating the processing of the injection hole 25 of the second board 20. FIG. 4B is a perspective diagram illustrating the attachment of the skin material 28. FIG. 4C is a perspective diagram illustrating the processing of the recessed groove 24. In FIGS. 4A to 4C, the illustration of the internal structure of the second board 20 is omitted.

First, as illustrated in FIG. 4A, a flat plate-shaped material including a porous structure is prepared as the second board 20. The injection holes 25 are formed in the edge joined to the first board 10. The injection hole 25 is processed by, for example, shearing by a press machine. The process is performed by punching a through hole (the injection holes 25) that penetrates from the main surface 20a through to the main surface 20b of the second board 20.

Next, as illustrated in FIG. 4B, the skin material 28 is attached to the main surface 20b. The skin material 28 is attached to at least a position where the recessed groove 24 (see FIG. 4C and the like) is formed. For example, various sheet-shaped materials such as a nonwoven fabric made of PET can be used for the skin material 28, similarly to the above-mentioned finish skin material. Thus, an inner surface of the recessed groove 24 can be prevented from melting and a burr from being created in the undermentioned step of forming the recessed groove 24. Naturally, it does not matter that the skin material 28 is attached to the whole main surface 20b or 20a of the second board 20, and used as the above-mentioned finish skin material concurrently. Furthermore, the step of attaching the skin material 28 may be executed prior to the above-mentioned step of forming the injection hole 25.

Next, as illustrated in FIG. 4C, a straight heat blade 65 (press mold) having a predetermined cross-sectional shape, heated to a high temperature (for example, approximately 190 to 230° C.), is pressed against the main surface 20b of the second board 20. Thus, the recessed groove 24 is formed. The step of forming the recessed groove 24 may be performed concurrently with the step of forming the injection hole 25.

FIG. 5A is a cross-sectional view of a RIM (Reaction Injection Molding) apparatus that molds the vehicle interior board 1 in a state where the thin plates 11 and 12 are set. FIG. 5B is a cross-sectional view thereof in a state where the second board 20 is set. FIG. 5C is a cross-sectional view thereof in a state where the hard polyurethane foam layer 13 is formed.

First, a primer (for example, a polyester coating or various primers of a chemical reaction type, volatile solvent type, water vaporing type, and hot melt type) is applied to one main surfaces 11a and 12a of the thin plates 11 and 12 that have been cut in a predetermined outline shape, and dried.

Next, as illustrated in FIG. 5A, the pretreated thin plate 11 is set in a recess 51 of an upper mold 50. At this point, with the main surface 11a to which the primer has been applied face down, the other main surface 11b is brought into contact with a setting surface 52. The steel thin plate 11 is attracted by the magnetic force of electromagnets 55 provided in the upper mold 50 and held by the upper mold 50. If, for example, a non-magnetic material such as aluminum is used for the thin plate 11, the thin plate 11 may be held by vacuum means.

Moreover, the pretreated thin plate 12 is similarly set in a recess 41 of a lower mold 40. At this point, with the main surface 12a to which the primer has been applied face up, the other main surface 12b are brought into contact with a setting surface 42. An electromagnet, vacuum unit, or the like may also be provided in the lower mold 40 to hold the thin plate 12.

Next, as illustrated in FIG. 5B, the second board 20 is set on the set surface 43 of the lower mold 40. At this point, the second board 20 is arranged such that the edge of the second board 20, where the injection holes 25 have been formed, overlaps with the predetermined overlap allowance X on the edge of the thin plate 12. In the drawings, for the purpose of description, the thicknesses of the thin plates 11 and 12 and the like are schematically illustrated large. As described above, the thin plates 11 and 12 are very thin. Hence, the level difference between the setting surfaces 42 and 43 is very small.

Figure 6:
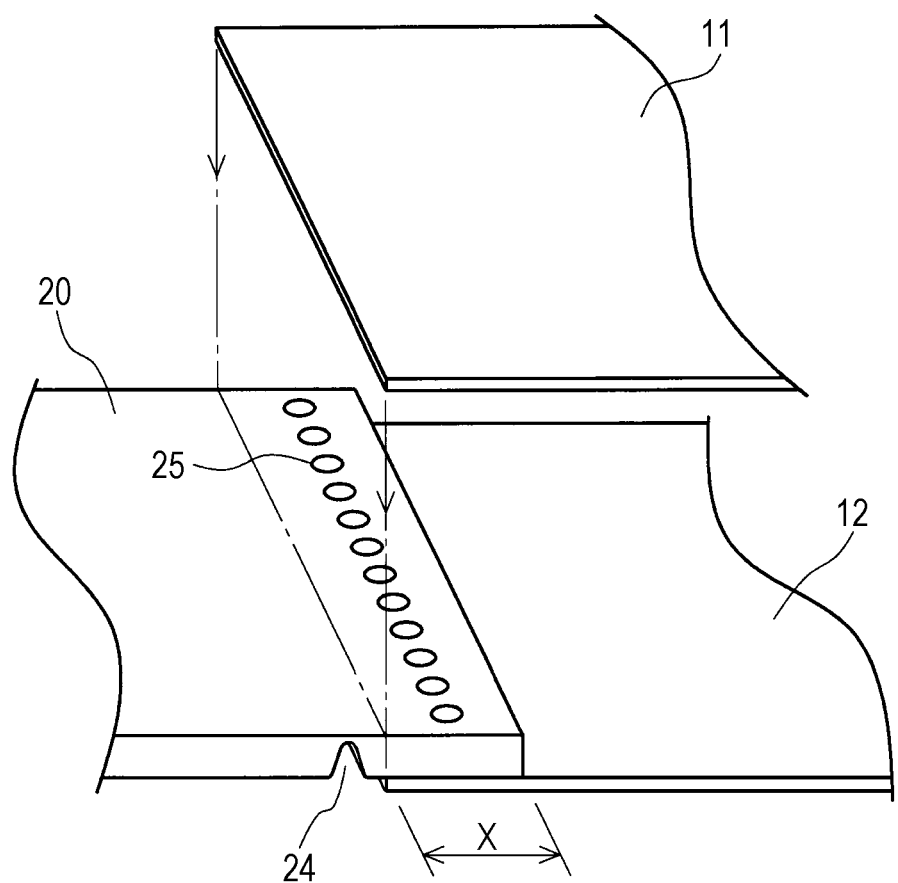
FIG. 6 is a perspective diagram illustrating the arrangement of the second board of the vehicle interior board according to the embodiment of the present invention.

Next, as illustrated in FIG. 5C, the upper mold 50 is lowered. Consequently, as illustrated in FIG. 6, one edge of the second board 20 is sandwiched between the edges of the thin plates 11 and 12. As illustrated in FIG. 5C, a molding space 60 is formed between the thin plates 11 and 12. Moreover, at the same time, an injection path 61 that communicates with the molding space 60 is formed by an injection channel 44 provided in the lower mold 40 and an injection 54 provided in the upper mold 50 (see FIG. 5B), and an injection port 45 provided in the lower mold 40.

The liquid material of hard polyurethane foam (in other words, mixed liquid materials including isocyanate and polyol) is injected into the molding space 60 from the injection port 45 through the injection path 61.

The lower mold 40 and the upper mold 50 are maintained by unillustrated heat unit at a predetermined temperature (60 to 80° C.). Consequently, the liquid raw material injected into the molding space 60 is heated in the molding space 60 to cause a chemical reaction, and foam and cure. As a consequence, the hard polyurethane foam layer 13, and the like are formed.

FIG. 7A is an enlarged cross-sectional view of the vicinity of the coupling portion, which illustrates the formation of the hard polyurethane foam layer 13. FIG. 7B is a top view thereof. As illustrated in FIG. 7A, the liquid raw material injected into the molding space 60 flows into the cavity portions 26 opening toward the end surface 20c side of the second board 20.

As described above, the recessed groove 24 is formed in the second board 20. Hence, the liquid raw material flows until it reaches a wall surface 24a on the edge side constituting the recessed groove 24 and stops there. In other words, the recessed groove 24 forms a boundary of an area into which the liquid raw material flows. In this manner, the step of forming the recessed groove 24 is executed before the step of forming the hard polyurethane foam layer 13. Thus, there will be no need to form a boundary of the molding space 60 separately on the second board 20 side. In other words, the recessed groove 24 exerts a function as a bendable hinge portion and a function as a boundary portion of the hard polyurethane foam layer 13.

Moreover, the liquid raw material injected into the molding space 60 is supplied to the gaps 31 and 32 formed between the thin plates 11 and 12 and the second board 20 through the injection holes 25 each including the openings 27 formed in the face plates 21 and 22, and the cavity portion 26. The liquid raw material flowing into the gaps 31 and 32 spread in a substantially circular form around the injection holes 25 in the gaps 31 and 32 as illustrated by a reference numeral 13a in FIG. 7B.

As illustrated in FIGS. 7A and 7B, the liquid raw material supplied to the cavity portions 26, and the gaps 31 and 32 reacts to foam and cure. Consequently, hard polyurethane foam layers 13b and 13a are also formed in the cavity portions 26, and the gaps 31 and 32. As a consequence, the first board 10 and the second board 20 can be joined firmly using the hard polyurethane foam layers 13a and 13b as joint members.

Especially, the forming of the injection hole 25 makes it possible to secure large joint areas of the hard polyurethane foam layers 13a that join the thin plates 11 and 12 to the second board 20 as illustrated in FIG. 7B. Thus, the joint strength of the first board 10 and the second board 20 can be further increased.

It is desired that an interval P (pitch) of the arrangement of the openings 27 be equal to or less than the size of the overlap allowance X in order to increase the joint strength of the first and second boards 10 and 20. Moreover, it is preferred that distances Y between the central positions of the openings 27, and the ends 10c of the thin plate 11 and 12 be approximately a third to half of the overlap allowance X. Such an arrangement is adopted to enable a reduction in the amount of the liquid raw material that flows out of the thin plates 11 and 12. In addition, large joint areas of the hard polyurethane foam layer 13a can be secured.

Furthermore, as described above, the primer is applied in advance to the main surfaces 11a and 12a (see FIG. 5A) to be the inner sides of the thin plates 11 and 12. Thus, the joints between the hard polyurethane foam layer 13, and the thin plates 11 and 12 become strong. Hence, the strength of the first board 10 can be increased, and the joint strength between the first board 10 and second board 20 can be further increased.

When the molding of the hard polyurethane foam layer 13 is completed, the holding of the electromagnets 55 (see FIG. 5C and the like) is released to lift up the upper mold 50 (see FIG. 5C and the like). The vehicle interior board 1 is then removed from the lower mold 40 (see FIG. 5C and the like). With the above steps, the vehicle interior board 1 integrated by coupling the first board 10 and the second board 20 including the recessed groove 24 to be a hinge portion is finished. An appropriate finish skin material is subsequently attached to the main surface of the vehicle interior board 1 depending on the use. Thus, a product that can be attached to a vehicle and the like is finished.

As described above, according to the vehicle interior board 1 of the present invention, the step of molding the first board 10 includes molding the second board 20 concurrently while joining and integrating the first board 10 and the second board 20. Hence, the step of coupling and assembling the first and second boards 10 and 20 become unnecessary apart from the step of molding the first board 10. Hence, the productivity of the vehicle interior board 1 can be improved.

Figure 8:
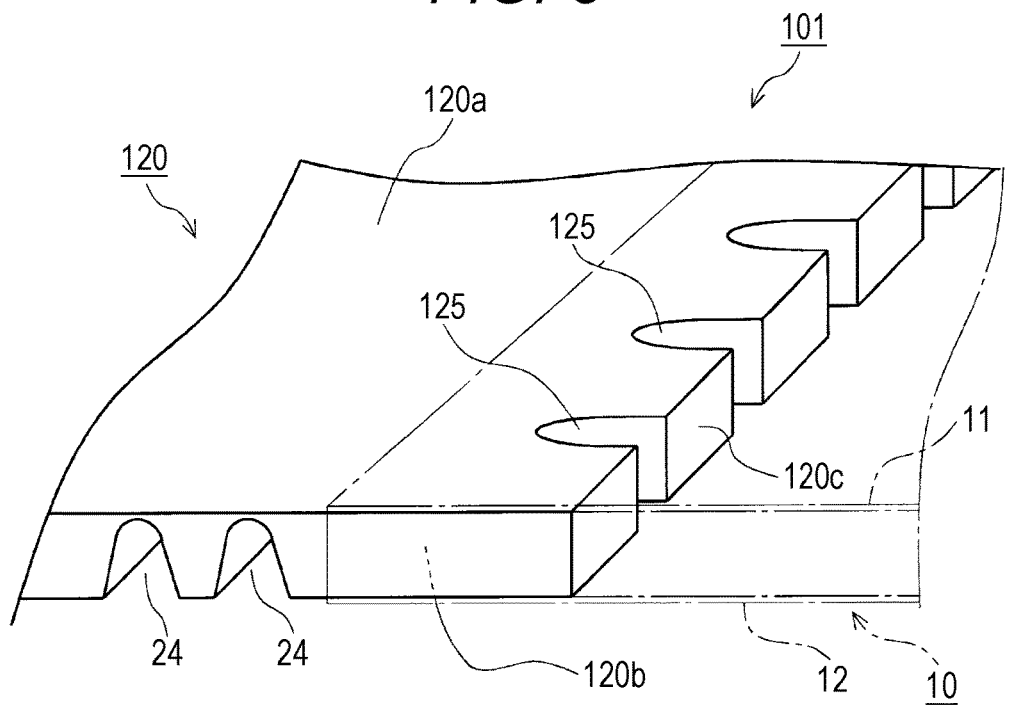
FIG. 8 is a perspective diagram illustrating a general structure of the vicinity of a coupling portion of a vehicle interior board according to another embodiment of the present invention.
Figure 9:
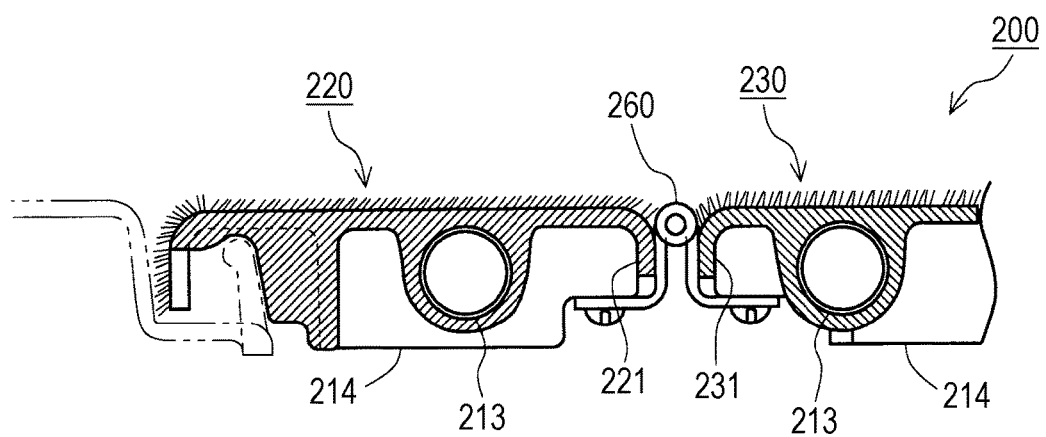
FIG. 9 is an enlarged cross-sectional view of the vicinity of a coupling portion illustrating an example of a vehicle interior board of a known technology.

Next, a modification of the embodiment will be described with reference to FIG. 8. FIG. 8 is a perspective diagram illustrating a general structure of the vicinity of the coupling portion of a vehicle interior board 101 according to another embodiment of the present invention. The same reference numerals are assigned to components that have the same or similar operation and effect as or to the vehicle interior board 1 that has already been described, and their descriptions will be omitted.

As illustrated in FIG. 8, a plurality of the recessed grooves 24 is formed in a second board 120. Thus, a larger bending angle of the vehicle interior board 101 can be secured.

An injection hole 125 is formed at an edge of the second board 120, the edge being joined to the first board 10. The injection hole 125 opens toward an end surface 120c side, has a substantially U-shaped cross section, and penetrates from one main surface 120a through to the other main surface 120b. In this manner, the injection hole 125 that opens toward the end surface 120c side is provided. Accordingly, even if a closed-cell foam type foam material is adopted as a porous structure included in the second board 120, the first board 10 and the second board 120 can be joined firmly. In other words, even with a porous structure where internal cavities do not communicate with each other, liquid raw material of hard polyurethane foam can be supplied efficiently between the second board 120 and the thin plates 11 and 12 through the injection holes 125.

As described above, the embodiment illustrates the example where the second board 20 where the recessed groove 24 is formed in advance is set in the lower mold 40 of the RIM apparatus with reference to FIG. 5B. Alternatively, the recessed groove 24 may be formed after setting the second board 20 in the lower mold 40. In other words, a manufacturing apparatus may be configured to serve as the heat blade processing machine and the RIM machine by mounting the heat blade 65 (see FIG. 4C) that forms the recessed groove 24 on the RIM apparatus. At this point, the step of forming the recessed groove 24 is executed before the step of forming the hard polyurethane foam layer 13. Thus, a boundary of the formation of the hard polyurethane foam layer 13 can be formed by the recessed groove 24 as in the above description.

Moreover, the step of forming the recessed groove 24 in the second board 20 is described with reference to FIGS. 4B and 4C. Alternatively, naturally, it does not matter that a flat-shaped porous structure where the recessed groove 24 is formed in advance is prepared (purchased). Moreover, the injection hole 25 and the recessed groove 24 may be similarly processed using a porous structure to which the skin material 28 is attached in advance.

Moreover, the configuration of the RIM apparatus illustrated in FIGS. 5A to 5C is merely a schematic example, and another configuration can be adopted. For example, the upper mold 50 and the lower mold 40 may be rotatably coupled by hinge unit. Moreover, the portion where the second board 20 is arranged is not necessarily held by the upper mold 50.

The present invention is not limited to the above embodiment. In addition, various changes can be made to the present invention without departing from the gist of the present invention.

DESCRIPTION OF REFERENCE SIGNS 1, 101 Vehicle interior board
10 First board
11, 12 Thin plate
11a, 12a Main surface of the thin plate
13 Hard polyurethane foam layer
20, 120 Second board
20a, 20b, 120a, 120b Main surface of the second board
21, 22 Face plate
23 Core material
24 Recessed groove
25, 125 Injection hole
26 Cavity portion
27 Opening
31, 32 Gap
60 Molding space

The invention claimed is:

1. A method for manufacturing a vehicle interior board having a first board joined to a second board in plane and in a substantially band form, the method comprising the steps of:
arranging a pair of opposing thin plates to have a main surface of one of the thin plates opposing a main surface of the other of the thin plates with a predetermined distance therebetween;
forming the second board of a plate-shaped porous structure having two plates spaced from one another at least at an edge of the second board, a main surface of one of the two plates opposing a main surface of the other of the two plates at the edge, and a plurality of sheared injection holes penetrating through each of the two plates of the second board at the edge;

inserting the edge of plate-shaped porous structure of the second board, where the injection holes are formed, within a cavity defined by the predetermined distance between a predetermined width part of the pair of thin plates so that gaps are formed between the pair of thin plates and the edge of the plate-shaped porous structure; and injecting liquid raw material of hard polyurethane foam into a space disposed between the pair of thin plates, whereby a chemical reaction causes the injected material to form a hard polyurethane foam, wherein the step of injecting includes supplying the liquid raw material between the spaced plates of the second board, through the injection holes of each of the two plates, and into the gaps formed between the pair of thin plates and the plate-shaped porous structure, and wherein said forming of the hard polyurethane foam simultaneously forms the first board while joining and integrating the first and second boards together at the gaps formed between the pair of thin plates and the plate-shaped porous structure, the first board comprised of the pair of thin plates with at least some of the hard foam sandwiched therebetween.

2. The method for manufacturing the vehicle interior board according to claim 1, further comprising the step of forming a V-cross-sectional-shaped recessed groove hinge in at least one of the two plates of the second board.

3. The method for manufacturing the vehicle interior board according to claim 2, wherein:

the plate-shaped porous structure comprises a honeycomb structure including at least the two plates as a pair of face plates and a core material sandwiched between the face plates, the step of forming the injection holes includes forming an opening communicating with the sandwiched core material, and the step of forming the recessed groove is prior to forming the hard polyurethane foam layer, wherein the recessed groove is formed along a position where an end of the first board is arranged.

* * * * *